United States Patent [19]

Kontny et al.

[11] 4,052,492

[45] Oct. 4, 1977

[54] METHOD FOR PRODUCING PREFORMED EXPANSION JOINT FILLERS

[75] Inventors: Merle E. Kontny, Portland; Dorsey J. Morris, St. Helens, both of Oreg.

[73] Assignee: Kaiser Gypsum Company, Inc., Oakland, Calif.

[21] Appl. No.: 586,953

[22] Filed: June 16, 1975

[51] Int. Cl.$^2$ ............................................. B01J 2/06
[52] U.S. Cl. ..................................... 264/6; 264/11; 264/13
[58] Field of Search ..................... 264/13, 11, 6, 118, 264/86; 162/171

[56] References Cited

U.S. PATENT DOCUMENTS

| | | | |
|---|---|---|---|
| 2,652,591 | 9/1953 | Kuhn | 264/11 |
| 3,446,877 | 5/1969 | Endler | 264/13 |
| 3,538,200 | 11/1970 | Hite | 264/13 |
| 3,739,049 | 6/1973 | Honjo | 264/13 |

Primary Examiner—Robert F. White
Assistant Examiner—James R. Hall
Attorney, Agent, or Firm—Verbeck and Haller

[57] ABSTRACT

The method of impregnating substantial amounts of asphalt into fiberboard. Melted asphalt having desired properties for use with fiberboard is atomized and then chilled by passage through cold water sprays, and into a cellulose-fiber-containing slurry. The asphalt used has a high penetration at elevated temperatures and is atomized at a lower temperature than is ordinarily utilized in producing atomized asphalt. The slurry may then be pumped into a chest, stored therein, pumped into a deculator, and then to a head box and flowed on to the wire screen of a Fourdrinier machine, forming a wet mat. Or, the asphalt-containing slurry may be further asphalt-enriched by spraying atomized asphalt into it as previously, and then pumped into a chest enroute to a Fourdrinier machine. Water drains through the wire screen, and the mat then goes to the dryer. The slurry-handling and the board-forming steps are conventional.

5 Claims, 1 Drawing Figure

METHOD FOR PRODUCING PREFORMED EXPANSION JOINT FILLERS

BACKGROUND OF THE INVENTION

The present invention pertains to a novel method for producing improved preformed expansion joint filler and other products from cellulosic fiberboard.

In accordance with a generally practiced procedure for producing cellulosic fiberboard expansion joints filler, cellulosic fiberboards are conveyed through a bath containing cut-back asphalt. The boards are then stacked with slats between each board in order to permit both air drying and oven drying in order to evaporate the naphtha or other solvent used in cutting the asphalt. The dry boards are then restacked in units for shipment.

The discharge of solvent into the air results in ecological imbalance of the atmosphere, and attempts have been made in that regard to produce cellulosic fiberboard impregnated with asphalt which would result in a minimization or even elimination of the discharge of solvent into the air. Processes involving the use of an odorless solvent are expensive and require the continuation of dipping and handling costs. Likewise the collection and condensation of the solvent fumes from drying ovens involves a major capital investment while continuing the dipping and handling costs.

SUMMARY OF THE INVENTION

The present invention is directed to the provision of a new and unique method for producing cellulosic fiberboard in the form of preformed expansion joint filler by a procedure which does not require the use of odorless solvents or the collection and condensation of solvent from the drying areas. The procedure of the present invention comprises the introduction of low softening point asphalt into a fiber-containing slurry, preferably in a sequential series of steps which result in an asphalt-enriched slurry. That asphalt-enriched slurry is then conducted to the wire screen on a Fourdrinier machine, and board is formed therefrom using known procedures.

In the "bath" process, asphalt used is soft and pliable thereby contributing to the desirable finished product characteristics. However when this soft asphalt is atomized by spraying into cold water and then mixed with cellulose fiber slurry, or furnish, the asphalt agglomerates form lumps and tend to plug the Fourdrinier screens used in forming the board.

An asphalt which is hard enough to atomize properly, mixed with the cellulose fiber furnish, and not plug the Fourdrinier machine screens results in an expansion joint filler which does not slit satisfactorily An acceptable product requires that melted asphalt be particulated by spraying it through a cold water shower, in the fashion set out in U.S. Pat. No. 3,197,413 and then having the resulting particles go directly into an agitated stock slurry, not into more water to form a liquid suspension of non-coalescent particles of asphalt in water. This may be repeated to further enrich the slurry with asphalt.

In brief, the new process permits improved expansion joints to be made by mixing atomized asphalt having a penetration of at least 60° at 130° F. with cellulose fiber furnish, forming the board on the Fourdrinier machine, drying the board and stacking boards at the head rig. A secondary bath operation is no longer required, and air pollution is eliminated.

DESCRIPTION OF A PREFERRED EMBODIMENT

Figure 1:
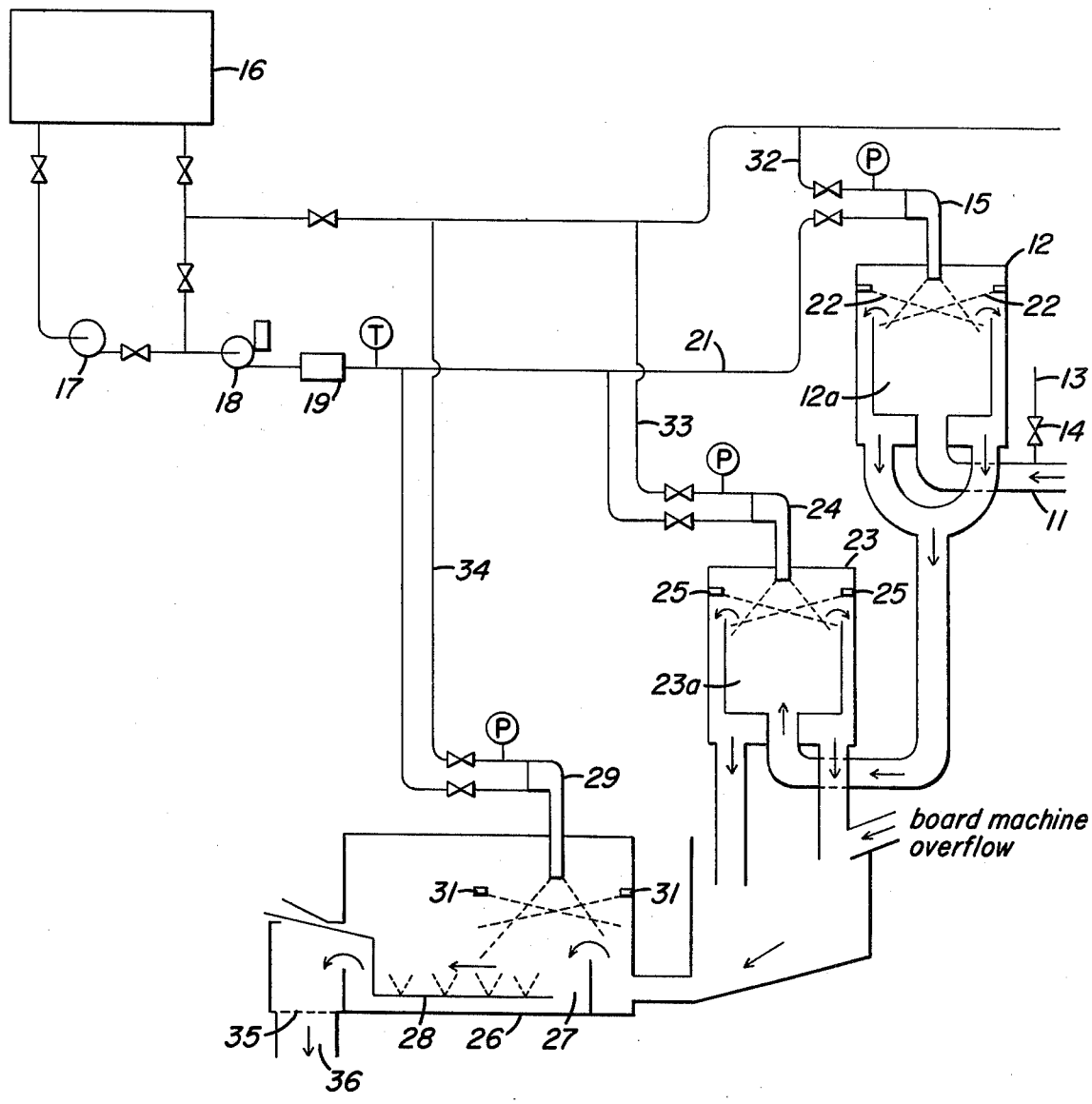

In further describing our invention in terms of a specific example it is to be understood that this is done to fully comply with the requirements of 35 U.S.C. 112, and that specific example is not intended to limit the invention in any way, since variations within the scope of my invention will readily occur to those silled in the art.

The invention will be more readily understood, and further advantages thereof will become apparent when reference is made to the more detailed description which follows, and to the accompanying drawing wherein:

FIG. 1 is a schematic diagram of the method of atomizing asphalt into a moving stream of wood fiber and water, in accordance with the invention.

Referring to the drawing, stock slurry flows through line 11 into the bottom of an atomizing chamber 12. Cold dilution water is conducted through line 13, equipped with a valve 14, to the stock to increase the volume of the mixture. As the stock overflows from the tub 12a of the atomizing chamber 12, asphalt is atomized into the moving stream. The asphalt is conducted to the atomizer 15 from storage tank 16 by means of a pump 17, through a metering pump 18, into a heater 19, through line 21 to the atomizing nozzle 15.

The atomized asphalt discharging from atomizing nozzle 15 passes through a cold water spray 22 which cools the asphalt particles before they reach the stock. The mixture of stock and atomized asphalt then flows by gravity to the bottom of the tub 23a in the middle atomizing chamber 23, and as it overflows the tub, additional asphalt is atomized into the mixture from atomizing nozzle 24, cold water being added through spray nozzles 25.

The mixture of stock and atomized asphalt then flows by gravity into a box 26 where it blends with the overflow from the board machine supply tank (not shown) before it enters the bottom atomizing chamber 27. As the mixture flows through the bottom atomizing chamber 27 it is agitated by compressed air from perforated pipes 28 and the final portion of asphalt is atomized into it, the asphalt flowing through atomizing nozzle 29, and cold water through spray nozzles 31. Steam lines to the atomizing nozzles are shown at 32, 33, and 34.

The mixture then flows by gravity through a grating or screen 35, through line 36 to the suction side of a stock chest pump, (not shown) where it is blended with stock from the stock chest (not shown) and pumped to the board machine supply tank, (not shown).

From the supply tank the slurry is conveyed to the wire screen of a Fourdrinier machine. There a wet mat is formed, the water drains through the wire, the mat then goes to the dryers, and the resulting board is cut to appropriate size. The slurry-handling and board-forming steps are conventional.

The asphalt, in the method above, is heated to an atomizing temperature of 350° F. for best results. The asphalt product preferred for use in the practice of our process is a commercial product available from the Mobil Oil Company, and is identified as R 145 - SP, 291617 and has the following characteristics:

Softening point 140°-150° F.
Flash point, Min. 450°.

Penetration at 77° F. 12.
Viscosity at 350° F., Cps. 50. max.
Weight per gallon, lbs. 9.4.
Solubility in carbon disulfide 99+.

The stock slurry flowing through line 11 comprises about 4 percent wood fiber and about 96 percent water containing sufficient wax emulsion, starch and alum so that the final expansion joint filler will contain about 55% wood fiber, about 35% asphalt, about 1% starch, about 5% wax emulsion, about 1% alum, on a bone dry basis.

A preferred wax emulsion is Paracol 404N, manufactured by Hercules, Incorporated, having the following typical properties:

| Total solids, % | 47 |
| --- | --- |
| Wax type | Paraffin |
| Wax melting point, ° F (° C) | 125-135 (52-57) |
| Wax color | Light amber |
| Emulsion pH | 6.0-6.5 |
| Density, lbs/gal. (KG/l) | 8.0 (0.96) |
| Average particle size, microns | 1-2 |
| Mechanical stability | Excellent |
| Electrolyte stability to: | |
| Acids | Stable |
| Alkalies | Stable |
| Alum (also other bi- and trivalent inorganic salts) | Stable |
| Effect of freezing | Adverse |

The finished product — the preformed expansion joint — is normally produced in sizes which may be three-eighths, one-half, three-fourths or 1 inch thick, 3 or 4 feet wide and 10 feet long, although these sizes may vary, as determined by trade requirements.

Other characteristics of the finished product are:

Water absorption percent by volume, Max. 15 after 24 hour immersion in water.

Compression to 50% of thickness (⅜ inch board) 100-1,250 psi.

Recovery, percent, MIN. 70% after compression to 50% of thickness.

It is thus seen, that our improved process not only is ecologically desirable but is economical and results in an improved product having an unexpectedly high and desirable asphalt content.

We claim:

1. In a method for producing preformed fiberboard expansion joint fillers wherein
   1. asphalt is heated to a liquid state,
   2. the liquid asphalt is sprayed through a first atomizing device to form a first atomized asphalt,
   3. the first atomized asphalt is passed through a first spray of cooling water whereby said first atomized asphalt is chilled and formed into a first shower of solidified asphalt particles,
   4. the shower of asphalt particles is incorporated into a cellulose-fiber-containing slurry in a first container to form an asphalt-and-cellulose-fiber-containing slurry,
   5. the asphalt-and-cellulose-fiber-containing slurry is conducted to a wire screen and wet mat formed thereon, and
   6. the wet mat dried then slit to form preformed fiberboard expansion joint fillers,
   the improvement comprising:
   a. using as the said asphalt in step (1), one having a penetration of at least 60 at 130° F, and
   b. carrying out said heating of the asphalt, in step (1), to about 350° F.

2. The method of claim 1 wherein the cooling water is at a temperature below about 140° F.

3. The method of claim 1 wherein the asphalt has a flash point above 450° F., and a viscosity at 350° F. of less than about 50 cps.

4. The method of claim 1 wherein the asphalt-and-cellulose-fiber-containing slurry in the first container, in step (4), is enriched with asphalt by conducting the slurry from said first container to a second container, and incorporating into said slurry in said second container asphalt particles which have been formed by: heating asphalt having a penetration of at least 60° at 130° F to about 350° F, spraying that heated asphalt through a second atomizing device to form a second atomized asphalt and passing that second atomized asphalt through a second spray of cooling water to form solidified particles thereof.

5. The method of claim 4 wherein the said asphalt enriched slurry in the second container is further enriched with asphalt by conducting the asphalt enriched slurry from said second container to a third container, and incorporating into the asphalt enriched slurry in said third container asphalt particles which have been formed by: heating asphalt having a penetration of at least 60 at 130° F. to about 350° F, spraying that heated asphalt through a third atomizing device to form a third atomized asphalt and passing that third atomized asphalt through a third spray of cooling water to form solidified particles thereof.

* * * * *